(12) United States Patent
Li

(10) Patent No.: US 11,338,885 B2
(45) Date of Patent: May 24, 2022

(54) ASSISTANCE CONTROL SYSTEM

(71) Applicant: Yueh-Han Li, Guanshan Township (TW)

(72) Inventor: Yueh-Han Li, Guanshan Township (TW)

( * ) Notice: Subject to any disclaimer, the term of this patent is extended or adjusted under 35 U.S.C. 154(b) by 326 days.

(21) Appl. No.: 16/538,406

(22) Filed: Aug. 12, 2019

(65) Prior Publication Data

US 2020/0055565 A1 Feb. 20, 2020

(30) Foreign Application Priority Data

Aug. 20, 2018 (TW) ................................. 107128998

(51) Int. Cl.
- *B62M 6/50* (2010.01)
- *B60L 50/20* (2019.01)
- *B62M 6/55* (2010.01)

(52) U.S. Cl.
CPC ............... *B62M 6/50* (2013.01); *B60L 50/20* (2019.02); *B62M 6/55* (2013.01); *B60L 2200/12* (2013.01)

(58) Field of Classification Search
CPC . B62M 6/45; B62M 6/15; B62M 6/55; B62M 6/50; B60L 2200/12; B60L 50/20
USPC .................. 180/206.2, 206.3, 205.3
See application file for complete search history.

(56) References Cited

U.S. PATENT DOCUMENTS

| 5,798,702 A * | 8/1998 | Okamoto ........... G01R 31/3842 340/636.1 |
| 2014/0121877 A1* | 5/2014 | Hosaka ............... B60L 15/2045 701/22 |

FOREIGN PATENT DOCUMENTS

| DE | 102013214169 A1 * | 1/2015 | ............ B62M 6/50 |
| DE | 102017000490 A1 * | 7/2018 | ............ B62J 50/20 |
| EP | 3064423 A1 * | 9/2016 | ............ B62J 45/413 |
| FR | 3067323 A1 * | 12/2018 | ............ B62M 6/45 |
| KR | 20160059329   *   | 5/2016 | |

OTHER PUBLICATIONS

DE102017000490 to Nagler, publ. Jul. 2018, filed Jan. 2017 (Year: 2018).*

* cited by examiner

*Primary Examiner* — Anne Marie M Boehler
(74) *Attorney, Agent, or Firm* — MLO, a professional corp.

(57) ABSTRACT

An assistance control system includes a sensor mounted on a cycle body of a cycle, and a controller communicable with the sensor and an assistance module of the cycle. The sensor senses operation of the cycle body so as to output a sense signal indicative of a state of usage of the cycle body. Based on the sense signal, the controller switches between a boost mode and a deboost mode. In the boost mode, the controller outputs a control signal to the assistance module so as to control the assistance module to increase assistive torque for driving movement of the cycle body. In the deboost mode, the controller outputs the control signal to the assistance module so as to control the assistance module to decrease the assistive torque.

7 Claims, 3 Drawing Sheets

ASSISTANCE CONTROL SYSTEM

CROSS-REFERENCE TO RELATED APPLICATION

This application claims priority of Taiwanese Invention Patent Application No. 107128998, filed on Aug. 20, 2018.

FIELD

The disclosure relates to an assistance control system, and more particularly to an assistance control system adapted to facilitate operation of a cycle.

BACKGROUND

Conventionally, a cycle (e.g., a bicycle) with an assistance module (e.g., an electric bicycle) utilizes a torque sensor mounted on the cycle to sense pedaling force exerted by a cyclist on the cycle, and the assistance module determines, based on the pedaling force sensed by the torque sensor, a level of auxiliary propulsion power to be provided by the assistance module for assisting propulsion of the cycle so as to reduce the force required to pedal the cycle. The level of auxiliary propulsion power provided is positively correlated to the pedaling force, so such control scheme is not so convenient to the cyclist, especially when the cyclist is too tired to pedal.

In addition, due to limited space on a cycle, it is difficult to install a controller and an input interface that gives the cyclist direct and active control over the operation of the cycle.

SUMMARY

Therefore, an object of the disclosure is to provide an assistance control system adapted to facilitate operation of a cycle that can alleviate at least one of the drawbacks of the prior art.

According to the disclosure, the cycle includes a cycle body, and an assistance module that is controlled to output an assistive torque for driving movement of the cycle body. The assistance control system includes a sensor mounted on the cycle body, and a controller communicable with the sensor and the assistance module. The sensor is configured to sense operation of the cycle body so as to output a sense signal indicative of a state of usage of the cycle body. The controller is configured to switch between a boost mode and a deboost mode based on the sense signal. In the boost mode, the controller outputs a control signal to the assistance module so as to control the assistance module to enhance the assistive torque. In the deboost mode, the controller outputs the control signal to the assistance module so as to control the assistance module to decrease the assistive torque.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
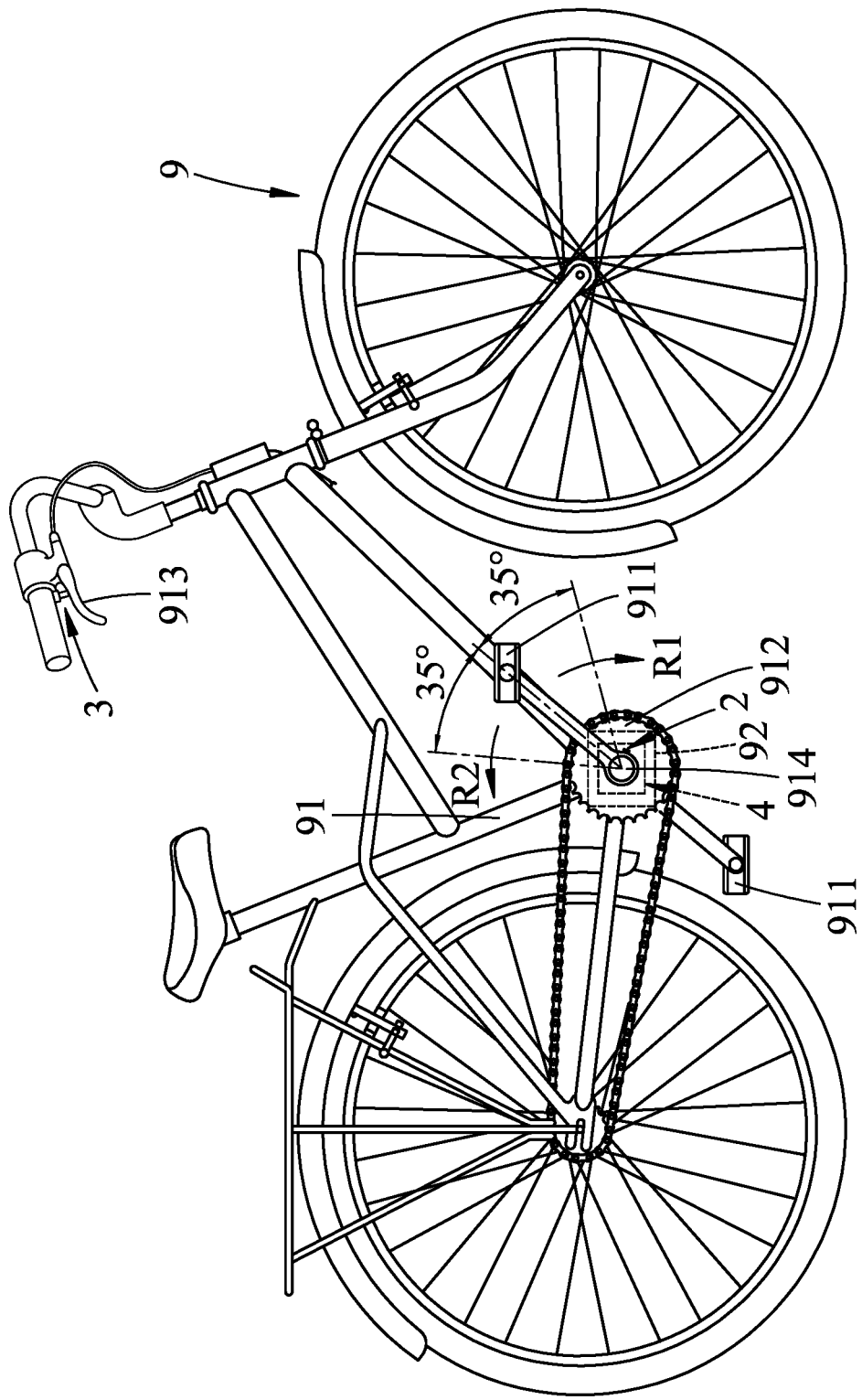
FIG. 1 is a schematic view illustrating an embodiment of an assistance control system adapted to facilitate operation of a cycle according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
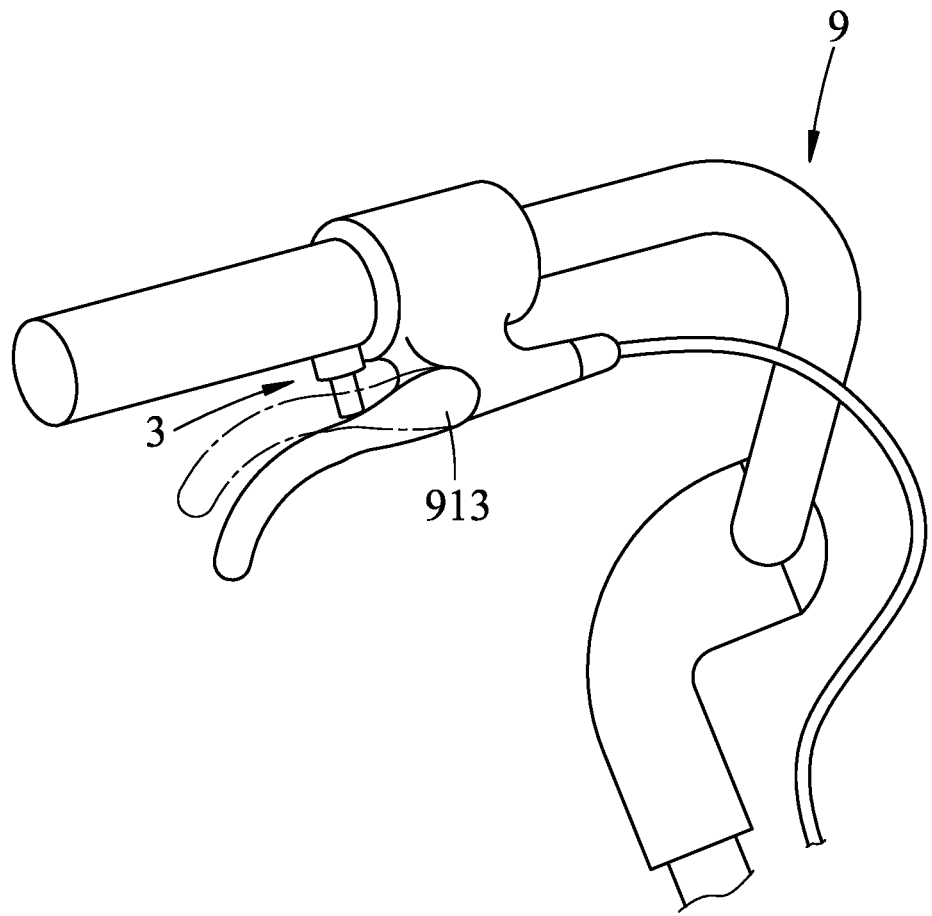
FIG. 2 is a fragmentary schematic view illustrating an embodiment of a sensor of the assistance control system mounted on one of the brake-levers of the cycle.
Figure 3:
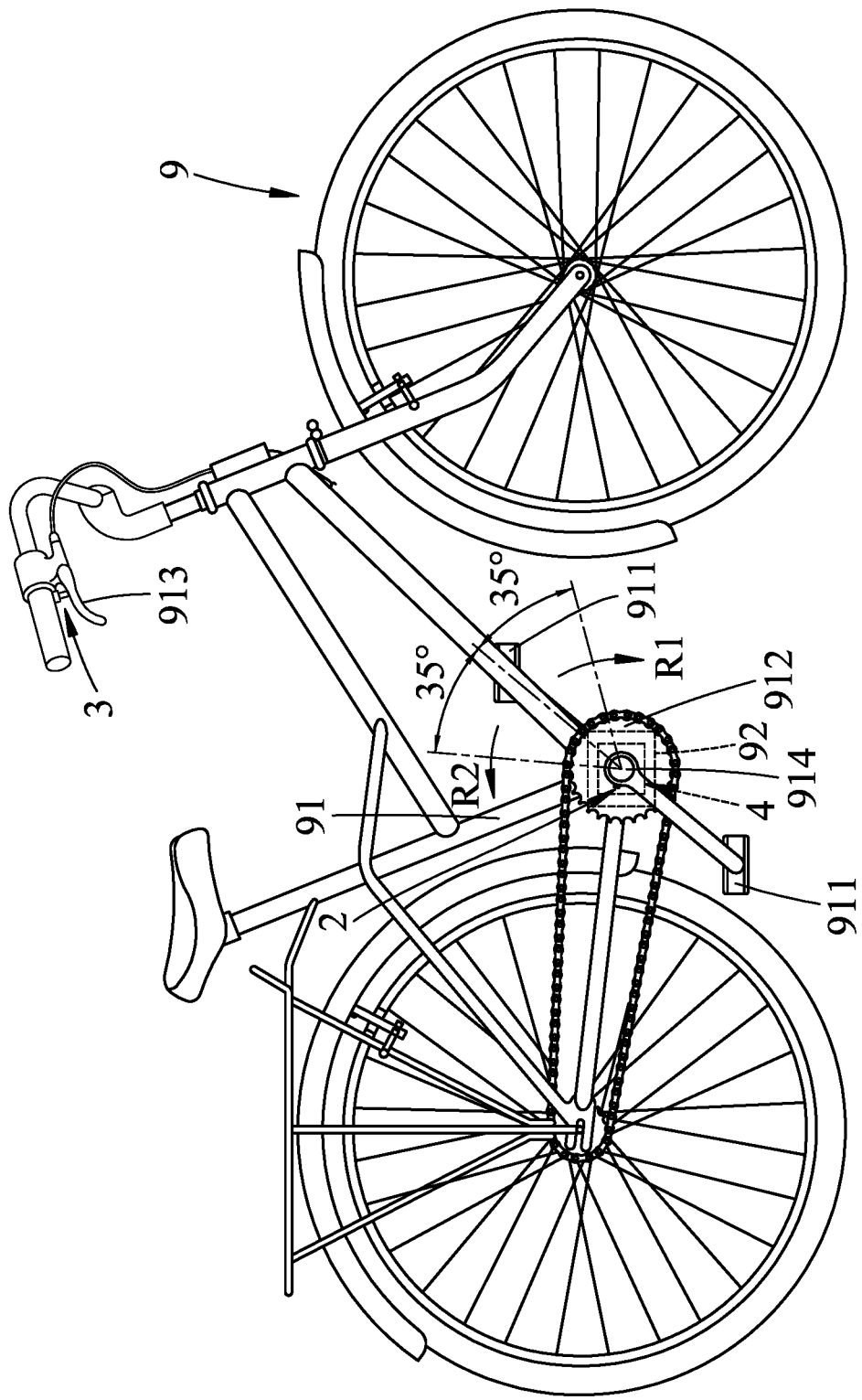
FIG. 3 is another schematic view illustrating the embodiment of the assistance control system according to the disclosure.

Referring to FIGS. 1 to 3, an embodiment of an assistance control system adapted to facilitate operation of a cycle 9 is illustrated. The cycle 9 includes a cycle body 91, and an assistance module 92 that is controlled to output an assistive torque for driving movement of the cycle body 91. It should be noted that provision of the assistive torque by the assistance module 92 is implemented by a motor-drive mechanism. Since the motor-drive mechanism has been well known to one skilled in the relevant art, detailed explanation of the same is omitted herein for the sake of brevity.

The cycle body 91 includes two pedals 911, two brake-levers 913 (only a single brake-lever 913 is shown in FIGS. 1 and 3), a bottom bracket spindle 914, and a crankset 912 that is co-rotatably coupled to the bottom bracket spindle 914. The pedals 911 are rotatably mounted to the crankset 912. One of the bottom bracket spindle 914 and the crankset 912 (i.e., either the bottom bracket spindle 914 or the crankset 912) is driven to rotate by the assistance module 92 with the assistive torque. Said one of the bottom bracket spindle 914 and the crankset 912 is rotatable in a forward direction (R1) for propelling the cycle 9 to move forward, and also in a backward direction (R2) that is reverse to the forward direction (R1).

The assistance control system includes a first sensor 2, two second sensors 3 (only a single second sensor 3 is shown in FIGS. 1 and 3), and a controller 4.

The first sensor 2 is mounted on the cycle body 91. The first sensor 2 is configured to sense operation of the cycle body 91 so as to output a first sense signal indicative of a state of usage of the cycle body 91. In this embodiment, the first sensor 2 is to be mounted on one of the bottom bracket spindle 914 and the crankset 912, and is configured to sense movement of said one of the bottom bracket spindle 914 and the crankset 912. The first sense signal indicates a state of movement of said one of the bottom bracket spindle 914 and the crankset 912. In this embodiment, the state of movement of said one of the bottom bracket spindle 914 and the crankset 912 may be a direction of rotation or a degree of rotation angle. The first sensor 2 may be an angular position sensor or a rotary position sensor, but implementation of the first sensor 2 is not limited to the disclosure herein and may vary in other embodiments.

The second sensors 3 are respectively mounted on the brake-levers 913. Each of the second sensors 3 is configured to sense operation of the respective one of the brake-levers 913 and to output a second sense signal based on result of the sensing, wherein the second sense signal is indicative of a state of usage of the cycle body 91. In this embodiment, the second sense signal indicates that the respective one of the brake-levers 913 is in a pull condition (i.e., is being pulled). The brake-lever 913 in the pull condition is illustrated with dash-dotted lines in FIG. 2. In this embodiment, each of the second sensors 3 is an electronic switch, but implementation of the second sensors 3 is not limited to the disclosure herein and may vary in other embodiments.

The controller 4 is communicable with the first sensor 2, the second sensors 3 and the assistance module 92. The controller 4 is configured to output a control signal to the assistance module 92 after receiving at least one of the first sense signal and the second sense signals. The aforementioned communication is conducted over a wired connection in this embodiment, but may be implemented by wireless transmission in other embodiments.

The controller 4 in this embodiment is configured to switch between a boost mode, a deboost mode and a stop mode based on the first sense signal, and to switch to an awaken mode based on the second sense signal.

Specifically speaking, the controller 4 is configured to switch to the awaken mode when it is determined based on the second sense signal that the corresponding one of the brake-levers 913 has been pulled for a predefined waken period. In this embodiment, the predefined waken period is two seconds, but is not limited thereto. In the awaken mode, the controller 4 outputs the control signal to control the assistance module 92 to be powered on.

After the controller 4 has switched to the awaken mode and the assistance module 92 has been powered on, the controller 4 is further configured to switch to one of the boost mode and the deboost mode when it is determined based on the first sense signal that rotation direction of said one of the bottom bracket spindle 914 and the crankset 912 has been repeatedly transitioned between the forward direction (R1) and the backward direction (R2) for a predefined number of times within a predefined sense period. Note that one transition in either way (from the forward direction (R1) to the backward direction (R2), or from the backward direction (R2) to the forward direction (R1)) is counted as one time. In this embodiment, the predefined number of times is three, and the predefined sense period is three seconds, but these parameters are not limited to examples given in this disclosure.

More particularly, the controller 4 is configured to switch to the boost mode when it is determined based on the first sense signal that rotation direction of said one of the bottom bracket spindle 914 and the crankset 912 has been repeatedly and sequentially transitioned from the forward direction (R1) to the backward direction (R2) for the predefined number of times within the predefined sense period while said one of the bottom bracket spindle 914 and the crankset 912 remains in a position (or orientation) that is within a preset angular range. In the boost mode, the controller 4 outputs the control signal to the assistance module 92 so as to control the assistance module 92 to increase the assistive torque. In this embodiment, the preset angular range is 45°±35° for a right crankarm of the crankset 912, where 0° represents an upward direction (i.e., upright orientation of the right crankarm) and 90° represents a forward direction of the cycle 9 (see FIG. 1) (i.e., horizontal and forward orientation of the right crankarm). However, the preset angular range is not limited to the example given herein and may vary in other embodiments.

On the other hand, the controller 4 is configured to switch to the deboost mode when it is determined based on the first sense signal that rotation direction of said one of the bottom bracket spindle 914 and the crankset 912 has been repeatedly and sequentially transitioned from the backward direction (R2) to the forward direction (R1) for the predefined number of times within the predefined sense period while said one of the bottom bracket spindle 914 and the crankset 912 remains in a position (or orientation) that is within another preset angular range different from the preset angular range. In the deboost mode, the controller 4 outputs the control signal to the assistance module 92 so as to control the assistance module 92 to decrease the assistive torque. In this embodiment, said another preset angular range is 45±35° for a left crankarm of the crankset 912 (see FIG. 3). However, said another preset angular range is not limited to the above example and may vary in other embodiments.

It should be noted that each time the controller 4 switches to the boost mode, the assistive torque is increased by a fixed increment, and each time the controller 4 switches to the deboost mode, the assistive torque is decreased by a fixed decrement. Therefore, a desired assistive torque may be achievable through multiple rounds of mode transitions.

The controller 4 is configured to switch to the stop mode when it is determined based on the first sense signal that said one of the bottom bracket spindle 914 and the crankset 912 has been continuously rotating in the backward direction (R2) for a preset number of turns. In the stop mode, the controller 4 outputs the control signal to control the assistance module 92 to be powered off. The preset number of turns is two in this embodiment, but is not limited thereto in other embodiments. It should be noted that switching to the stop mode is permitted only when the controller 4 has switched to the awaken mode and the assistance module 92 has been powered on. Moreover, in a condition that the controller 4 has switched to the awaken mode, operation performed by a cyclist on the brake-lever(s) 913 for braking or decelerating the cycle 9 would not cause unintended mode switching of the controller 4, since the second sense signal resulting from operating the brake-lever 913 is dedicated to awakening the controller 4.

It is worthy to note that mode switching of the controller 4 may be implemented to be triggered based on an arbitrary combination of the first sense signal and the second sense signals. In one embodiment, during a period when a left one of the brake-levers 913 is being pulled, upon detecting that a right one of the brake-levers 913 is repeatedly pulled and released for a preset number of times based on the corresponding second sense signal, the controller 4 is triggered to control the assistance module 92 to provide a first predetermined assistive torque. Similarly, during a period when the right one of the brake-levers 913 is being pulled, upon detecting that the left one of the brake-levers 913 is repeatedly pulled and released for the preset number of times based on the corresponding second sense signal, the controller 4 is triggered to control the assistance module 92 to provide a second predetermined assistive torque. Consequently, operations of the cycle 9 with the assistance module 92 may be performed in a way that is directly controllable by the user where the user is given active control over the assistive torque provided by the assistance module 92.

It should be noted that the operations to trigger mode switching of the controller 4 are not ordinary actions required for riding the cycle 9, so unintentional triggering of mode switching is unlikely. However, mode switching of the controller 4 may be triggered in other ways, and the disclosure herein should not be taken as limitations in this respect.

In summary, the assistance control system utilizes the first sensor 2 and/or the second sensors 3 to sense operation of the cycle body 91 so as to output the first sense signal and/or the second sense signal indicative of the state of usage of the cycle body 91. Based on the first sense signal and/or one or both of the second sense signals, the controller 4 switches to one of the boost mode, the deboost mode, the awaken mode and the stop mode, and controls the assistance module 92 to adjust the assistive torque, correspondingly. Such control scheme may be easily performed by the cyclist, and facilitates operations of the cycle 9. Moreover, installation of the assistance control system according to the disclosure does not occupy much space.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An assistance control system adapted to facilitate operation of a cycle, the cycle including a cycle body, and an assistance module that is controlled to output an assistive torque for driving movement of the cycle body, the cycle body including two brake-levers, two pedals, a bottom bracket spindle, and a crankset that is co-rotatably coupled to the bottom bracket spindle, the pedals being rotatably mounted to the crankset, one of the bottom bracket spindle and the crankset being driven to rotate by the assistance module with the assistive torque, said one of the bottom bracket spindle and the crankset being rotatable in a forward direction for propelling the cycle to move forward, and in a backward direction that is reverse to the forward direction, said assistance control system comprising:
   a first sensor mounted on the cycle body, and configured to sense operation of the cycle body so as to output a first sense signal indicative of a state of usage of the cycle body;
   a controller communicable with said first sensor and the assistance module, and configured to, based on the first sense signal, switch between a boost mode where said controller outputs a control signal to said assistance module so as to control said assistance module to increase the assistive torque, and a deboost mode where said controller outputs the control signal to said assistance module so as to control said assistance module to decrease the assistive torque; and
   a second sensor mounted on one of the brake-levers, and communicable with said controller, said second sensor being configured to sense operation of said one of the brake-levers and to output a second sense signal based on result of the sensing, the second sense signal indicating that said one of the brake-levers is in a pull condition;
   wherein said first sensor is to be mounted on one of the bottom bracket spindle and the crankset, and is configured to sense movement of said one of the bottom bracket spindle and the crankset,
   wherein the first sense signal indicates a state of movement of said one of the bottom bracket spindle and the crankset,
   wherein said controller is configured to switch to one of the boost mode and the deboost mode when it is determined based on the first sense signal that rotation direction of said one of the bottom bracket spindle and the crankset has been repeatedly transitioned between the forward direction and the backward direction for a predefined number of times within a predefined sense period, and
   wherein said controller is configured to output the control signal to said assistance module after receiving at least one of the first sense signal and the second sense signal, and to switch to, based on the second sense signal, an awaken mode where said controller outputs the control signal to control said assistance module to be powered on.

2. The assistance control system as claimed in claim 1, wherein said controller is configured to switch to the boost mode when it is determined based on the first sense signal that rotation direction of said one of the bottom bracket spindle and the crankset has been repeatedly and sequentially transitioned from the forward direction to the backward direction for the predefined number of times within the predefined sense period while said one of the bottom bracket spindle and the crankset remains in a position that is within a preset angular range.

3. The assistance control system as claimed in claim 2, wherein said controller is configured to switch to the deboost mode when it is determined based on the first sense signal that rotation direction of said one of the bottom bracket spindle and the crankset has been repeatedly and sequentially transitioned from the backward direction to the forward direction for the predefined number of times within the predefined sense period while said one of the bottom bracket spindle and the crankset remains in a position that is within another preset angular range different from the preset angular range.

4. The assistance control system as claimed in claim 1, wherein said controller is configured to switch to the awaken mode when it is determined based on the second sense signal that said one of the brake-levers has been pulled for a predefined waken period.

5. The assistance control system as claimed in claim 1, wherein said controller is further configured to switch to, when it is determined based on the first sense signal that said one of the bottom bracket spindle and the crankset has been continuously rotated in the backward direction for a preset number of turns, a stop mode where said controller outputs the control signal to control said assistance module to be powered off.

6. The assistance control system as claimed in claim 1, wherein said second sensor is an electronic switch.

7. The assistance control system as claimed in claim 1, wherein said first sensor is one of an angular position sensor and a rotary position sensor.

* * * * *